June 26, 1951
R. J. GALITZ
2,558,482
ELECTRICAL APPARATUS
Filed Dec. 14, 1949
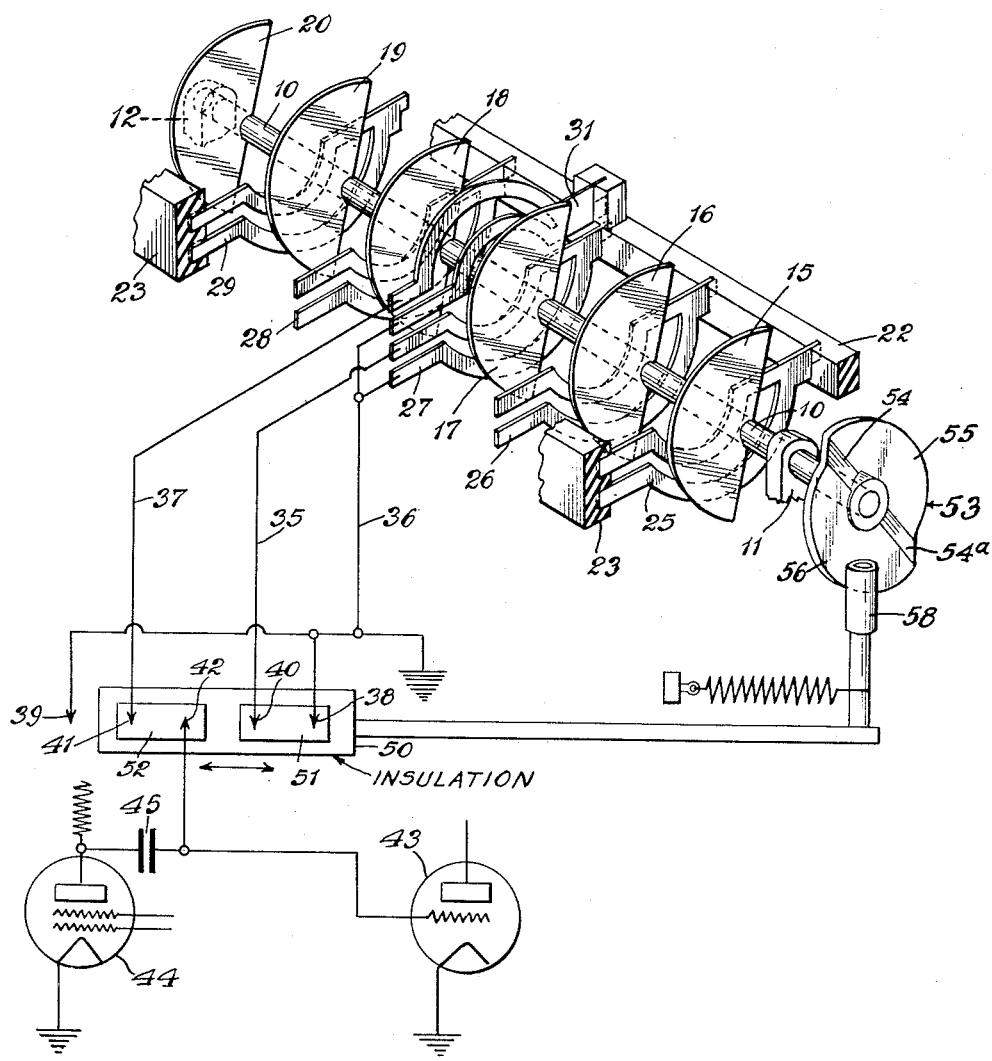
Inventor
Robert J. Galitz
by Robert L Kahn
Attorney Patented June 26, 1951

2,558,482

UNITED STATES PATENT OFFICE 2,558,482

ELECTRICAL APPARATUS

Robert J. Galitz, Skokie, Ill., assignor to Oak Mfg. Co., Chicago, Ill., a corporation of Illinois Application December 14, 1949, Serial No. 132,830

3 Claims. (Cl. 250—40)

This invention relates to an electrical apparatus and particularly to a high frequency tuner capable of operating over a wide band of frequencies. The invention provides a compact construction for a pair of tuning sections each section being usable over a different frequency band with the entire structure functioning as a unitary device to operate over substantially 360° angle.

In order that the invention will be fully understood, it will be explained in connection with the drawing wherein the single figure shows partly in isometric and partly in diagrammatic form, a tuner embodying the present invention.

Referring now to the drawing, the tuner structure itself may be carried by a suitable frame generally resembling the frame of a gang condenser used in home radio receivers. Inasmuch as the construction of such a frame is well known, a detailed description thereof is not deemed to be necessary. However, sufficient detail will be given so that the invention may be understood. Thus shaft 10 is journaled in suitable bearings 11 and 12 carried in a suitable framework not shown. Shaft 10 may be of metal or of insulating material and carries a plurality of rotor plates 15 to 20 inclusive at spaced intervals. These rotor plates may be of usual construction and may be either circular or shaped to provide a predetermined ratio of angular movement to frequency variation.

Cooperating with the rotor plates on shaft 10 are a number of stator elements carried by insulating supports generally indicated by numerals 22 and 23. Thus stators 25 to 29 inclusive may be substantially similar and each consists of a stator plate stamped out to provide an inductance loop. The two arms of the inductance loop form the terminals of the inductance and each stator cooperates with adjacent rotor plates in a manner well known in the art. It will be noted that stator plates 25 to 29 inclusive are in transverse alignment and extend below shaft 10. These stators all cooperate with the rotor plates to tune a desired frequency band. This frequency band may be either in the frequency modulation or television range.

With tuners such as described above, it is frequently necessary that an additional high frequency tuning range be provided. Previously it has been customary to provide additional stator and rotor units transversely displaced from stator units 25 to 29 inclusive and thus result in a structure which is unduly long. Inasmuch as the length of leads in high frequency circuits becomes of critical importance, such long tuning structures make the device bulky, expensive and electrically inefficient.

In order to provide an additional tuning range, this invention provides one or more additional stator units 31 which may also be an inductance loop as stator units 25 to 29 inclusive. Additional stator unit 31 is disposed above shaft 10 and preferably in the same plane with members of the first mentioned stator group. Thus as shown here, one stator unit 31 is provided, this lying generally in the same plane as stator unit 27. Stator units 27 and 31 cooperate with one pair of rotor plates 17 and 18 over an angle of about 360°.

Referring to stator plates 31 and 27, each forms an inductance loop. Stator plate 27 has its two arms connected to wires 35 and 36 respectively, wire 35 extending from the portion of the stator nearest shaft 10. Similarly, stator plate 31 is connected to wires 37 and 36. Wire 36 is connected to ground and also connected to stationary switch contacts 38 and 39 respectively. Wires 35 and 37 are connected to contacts 40 and 41 respectively. Switch contact 42 is connected to the input side of amplifier 43 fed by amplifier 44 through coupling condenser 45. No attempt is made to show the details of amplifiers 44 and 43 and, in practice, these amplifiers may have special vacuum tubes for use in the megacycle range.

It will be noted that contacts 39, 41, 42, 40 and 38 are all aligned and cooperate with movable member 50 carrying contact members 51 and 52. Movable member 50 may be moved in either of two positions. In the position shown, contacts 38 and 40 are connected together and short-circuit stator element 27. In this position, contacts 41 and 42 are connected together so that stator element 31 is connected to the amplifier. If the switch is moved to the left, contacts 39 and 41 will be short-circuited, while contacts 42 and 40 will connect stator element 27 to the amplifier.

It is preferred to move the switch at the proper time in relation to the position of the condenser and to this effect, a cam and linkage system as shown, is provided. Thus, the linkage system effectively snaps the switch from one position to the other when the rotor plates move from one predetermined angular range to a different angular range. As a rule, when the rotors fully engage one set of stators one end of the range is assumed. Then as the rotors move out of engagement with the one set of stators the other end of the range is approached. The other end of the range may be the rotor position when almost or fully disengaged. Then the other range may begin when the rotor fully engages the other stator.

Thus in terms of degrees, one range may extend from 0 to 165 degrees while the other range may extend from 180 to 345 degrees. The 15 degree gaps provide for cam action. In the figure, the rotors may be considered either at about 90 or about 270 degrees depending upon the direction of rotation.

Specifically, cam 53 carried by shaft 10 has diametral slopes 54 and 54a connecting parts 55 and 56. These parts are laterally offset. Cam follower 58 and a suitable linkage system operates switch part 50.

What is claimed is:

1. A tuner for covering two frequency bands in the megacycle range, said tuner comprising a frame having a shaft journaled for rotation therein, a plurality of spaced, parallel condenser-like rotor plates carried by said shaft, said plates being generally aligned along the shaft and subtending an angle of no more than about 180 degrees, at least two separate flat stators lying in one plane parallel to said rotor plates, said stators being opposed to each other and individually subtending angles of something less than 180 degrees, said stators being shaped to form inductance loops with the open ends thereof being adjacent each other and the stators having dissimilar circuit characteristics so that rotor plates may be operated over two separate successive angular ranges of about 180 degrees each to tune two frequency bands, said adjacent stator terminals being available for connection to other circuit components by short leads and the tuner as a whole being compact.

2. The tuner according to claim 1 wherein switching means are provided for shorting out an undesired stator and connecting a desired stator in circuit and means for mechanically coupling said switching means to said operating shaft, said coupling means being adapted to operate said switching means at two shaft positions about 180 degrees apart.

3. The structure according to claim 1 wherein switching means are connected to said stator plates for selectively utilizing said stators in circuits, a cam plate carried by said shaft, and follower means cooperating with said plate for operating said switching means to select the desired tuning range.

ROBERT J. GALITZ.

REFERENCES CITED

The following references are of record in the file of this patent:

UNITED STATES PATENTS

| Number | Name | Date |
|---|---|---|
| 1,727,641 | Grebe | Sept. 10, 1929 |
| 2,341,345 | Van Billiard | Feb. 8, 1944 |
| 2,471,705 | Schmitt | May 31, 1949 |